United States Patent Office 3,577,400
Patented May 4, 1971

3,577,400
NOVEL CATALYSTS FOR THE POLYMERIZATION OF ALICYCLIC OLEFINS
William Allen Judy, Akron, Ohio, assignor to The Goodyear Tire & Rubber Company, Akron, Ohio
No Drawing. Filed Aug. 26, 1968, Ser. No. 755,376
Int. Cl. C08f 15/04
U.S. Cl. 260—88.2                     13 Claims

ABSTRACT OF THE DISCLOSURE

A method for the ring opening polymerization of unsaturated alicyclic compounds containing at least 4 and not more than 5 carbon atoms and one double bond in the cyclic ring and unsaturated alicyclic compounds containing at least 8 carbon atoms and at least one double bond in the cyclic ring is disclosed which comprises subjecting such unsaturated alicyclic compounds to a catalyst system comprising (A) a tungsten or molybdenum halide or oxyhalide and (B) at least one Lewis acid of the formula $M-X_n$ where M is a metal represented by aluminum, zinc, gallium, tin and antimony; X is a halogen such as bromine, chlorine, iodine and fluorine and $n$ is an integer equal to the valence of M.

---

This invention relates to a process for polymerizing unsaturated alicyclic compounds and to the products resulting therefrom. In its broad aspect the invention is directed to the preparation of polymers derived from unsaturated alicyclic compounds which contain at least one alicyclic ring structure containing at least two carbon atoms connected through a double bond.

The polymerization process of this invention may be used to prepare novel solid polymers. The properties and characteristics of these polymers can be "tailor made" to fit a wide variety of uses and fields of application. The properties of the polymers resulting from the polymerization process of this invention can be varied over a wide range depending on (1) the particular unsaturated alicyclic monomer chosen to be polymerized (2) the particular polymerization catalyst employed and (3) the particular polymerization conditions employed. The products resulting from the polymerization of this invention can be employed in a variety of applications; for example, they may be employed to produce finished rubber articles such as pneumatic tires, molded goods and the like or they may be materials which are useful to manufacture articles such as films and fibers. They may also be employed to form finished products by molding techniques.

This invention comprises polymerizing at least one unsaturated alicyclic compound selected from the group consisting of (1) unsaturated alicyclic compounds containing at least 4 and not more than 5 carbon atoms in the cyclic ring and containing 1 carbon-to-carbon double bond in the cyclic ring, and (2) unsaturated alicyclic compounds containing at least 8 carbon atoms in the cyclic ring and containing at least 1 carbon-to-carbon double bond in the cyclic ring, by subjecting said alicyclic compounds to polymerization conditions in the presence of a catalyst system comprising (A) at least one transition metal salt selected from the group consisting of tungsten halides, tungsten oxyhalides, molybdenum halides and molybdenum oxyhalides and (B) at least one Lewis acid of the formula $M-X_n$ where M is a metal selected from the group consisting of aluminum, zinc, gallium, tin and antimony; X is a halogen selected from the group consisting of chlorine, bromine, iodine and fluorine and $n$ is an integer equal to the valence of M.

Representative examples of the tungsten and molybdenum halides useful as the first or (A) catalyst component of this invention include molybdenum dibromide, molybdenum tribromide, molybdenum tetrabromide, molybdenum trichloride, molybdenum tetrachloride, molybdenum pentachloride, molybdenum hexafluoride, tungsten dibromide, tungsten pentabromide, tungsten hexabromide, tungsten dichloride, tungsten tetrachloride, tungsten pentachloride, tungsten hexachloride, tungsten hexafluoride, tungsten diiodide and tungsten tetraiodide.

Representative examples of the tungsten and molybdenum oxyhalides include molybdenum oxytetrachloride, molybdenum oxytetrafluoride, tungsten oxytetrabromide, tungsten oxytetrachloride and tungsten oxytetrafluoride. The preferred metal halides and metal oxyhalides are those of tungsten. The most preferred are tungsten hexachloride, tungsten hexafluoride, tungsten oxytetrachloride and tungsten oxytetrafluoride.

Representative examples of the metal from which the Lewis acid, the second or (B) catalyst component of this invention, can be derived are aluminum, zinc, gallium, tin and antimony. The most preferred metal is that of aluminum.

Representative examples of these Lewis acids include aluminum trihalides such as aluminum trichloride, aluminum tribromide and the like; zinc dihalides such as zinc dichloride, zinc dibromide and the like; gallium trihalides such as gallium tribromide, gallium trichloride, gallium trifluoride and the like; tin tetrahalides such as tin tetrachloride, tin tetrabromide and the like; and antimony pentahalides such as antimony pentabromide, antimony pentachloride and the like. The most preferred Lewis acid compounds are those of aluminum trihalides.

The catalysts employed in this invention are prepared by mixing the catalyst components by known techniques. Thus, the catalysts may be prepared by in situ techniques. By "in situ" is meant that the catalyst components are added separately to the monomer to be polymerized.

The molar relationship of the two catalyst components of this invention may vary widely depending on the particular unsaturated alicyclic compound to be polymerized, the polymerization conditions, such as temperature and time, the purity of the polymerization system and the like. It has been found, however, that successful results are obtained in the practice of this invention when the molar relationship between the catalyst components (A) and (B) as previously defined are within a molar relationship of B/A ranging from about 3/1 to at least 500/1.

Various unsaturated alicyclic compounds may be employed in the practice of this invention. As is mentioned above, unsaturated alicyclic compounds containing at least 4 and not more than 5 carbon atoms in the cyclic ring which contain one carbon-to-carbon double bond in the cyclic ring and unsaturated alicyclic compounds containing at least 8 carbon atoms in the cyclic ring which contain at least one carbon-to-carbon double bond in the cyclic ring are operable in this invention.

The preferred unsaturated alicyclic compounds of this invention are those comprising a single unsaturated alicyclic ring. These alicyclic rings may be mono- or multi-substituted by such groups as alkyl, aryl, aralalkyl, and halogen groups.

Representative examples of unsaturated alicyclic compounds containing a single alicyclic ring having at least pounds containing a single alicyclic ring having at least 4 and not more than 5 carbon atoms in the cyclic ring and containing one double bond in said ring are cyclobutene and cyclopentene. Representative examples of compounds having at least 8 carbon atoms in the cyclic ring and having from one to two double bonds in said ring are cyclooctene; 1,4- and 1,5-cyclooctadiene. Representative of compounds having 9 carbon atoms and 1 to 3 double bonds in the ring are cyclononene, 1,4- and 1,5-cyclononadiene and 1,4,7-cyclononatriene. Representative of compounds having 10 carbon atoms and 1 to 3 double bonds in the ring are cyclodecene, 1,4-, 1,5- and 1,6-cyclodecadiene and 1,4,6- and 1,4,7-cyclodecatriene. Representative of compounds having 11 carbon atoms and 1 to 3 double bonds in the ring are cycloundecene, 1,4-, 1,5- and 1,6-cycloundecadienes and 1,4,7- and 1,4-8-cycloundecatriene. Representative of compounds having 12 carbon atoms and 1 to 3 double bonds in the ring are cyclododecene, 1,4-, 1,5-, 1,6- and 1,7-cyclododecadiene, and 1,4,7-, 1,4,8-, 1,4,9- and 1,5,9-cyclododecatriene.

The most preferred unsaturated alicyclic compounds of this invention are those containing from 1 to 3 carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, 1,5-cyclooctadiene and 1,5,9-cyclododecatriene.

Still another class of preferred unsaturated alicyclic monomers are those containing 1 carbon-to-carbon double bond in the ring of at least 4 and not more than 5 carbon atoms, examples of which are cyclobutene and cyclopentene. Another group which are preferred are those which have at least 8 carbon atoms in the ring and not more than 12 carbon atoms in the ring and contain 1, 2, or 3 carbon-to-carbon double bonds in said ring, examples of which are previously set forth.

Representative examples of substituted unsaturated alicyclic compounds are alkyl-substituted compounds such as 1,5,9-trimethylcyclododecatriene; aryl-substituted compounds such as 3-phenylcyclooctene-1; aralkyl-substituted compounds such as 3-benzylcycloocetene-1; alkaryl-substituted compounds such as 3-methylphenylcyclooctene-1; halogen-substituted compounds wherein the halogens are iodine, chlorine, bromine and fluorine such as 5-chlorocyclooctene-1, 3-bromocyclooctene-1, 5-chlorocyclododecene-1, and 5,6-dichlorocyclooctene-1. Mixtures of the unsaturated alicyclic compounds may be polymerized including both substituted unsaturated alicyclic compounds and the unsubstituted unsaturated alicyclic compounds.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as Tetralin; liquid aliphatic hydrocarbons such as pentane, heptane, hexane, petroleum ether, decane; and alicyclic hydrocarbons such as cyclohexane, Decalin, and cyclooctane. Mixtures of such solvents may also be used.

Temperatures at which the polymerization reaction is carried out can be varied over a wide range. Usually the temperature can be varied from extremely low temperatures such as $-60°$ C. up to high temperatures such as $150°$ C. or higher. Thus, the temperature is not a critical factor of the invention. It is generally preferred, however, to conduct the reaction at a temperature range of from about $-20°$ C. to about $80°$ C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogenous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In preforming the polymerizations of this invention, the introduction of the monomer, catalyst and solvent, when a solvent is employed, can each be made to the reaction zone alternately, intermittently, and/or continuously.

There appears to be no upper limit on the amount of the (B) catalyst component employed while the lower limit of the (B) catalyst component is dependent upon the amount of the (A) catalyst component employed. Of course, a catalytic amount of each catalyst component must be used and the minimum amount of the (A) catalyst component required for polymerization is about $5.0 \times 10^{-6}$ moles. The optimum amount of catalyst employed depends on a number of factors such as temperature, reactants used, purity of reactants used, reaction times desired and the like.

It is thought that the polymerizations of this invention take place through a ring-opening polymerization mechanism. Such ring-opening polymerizations of unsaturated alicyclic compounds can be used to make a number of alternating copolymers and terpolymers that have not been capable of being made before. For example, the ring-opening polymerization of cyclooctene yields a polyoctenamer which may be considered the alternating copolymer of 1 butadiene unit and 2 ethylene units.

The ring opening polymerization of cyclooctadiene-1,5 leads to a polybutenamer which is equivalent to the 1,4-addition polymer of butadiene-1,3. In practicing this invention, polybutenamers can be formed whose structure comprises alternative cis- and trans-vinylene groups in successive polymer repeating units which is equivalent to the polymer which may be obtained by the 1,4-addition polymerization of butadiene-1,3 in which successive butadiene-1,3 units alternately occur in cis- and trans-configurations. Such a polymer could be considered an alternating copolymer of cis- and trans-1,4 poly(butadiene-1,3).

Bulk polymerizations may be desirable from a process standpoint as relatively little heat appears to be evolved per mole of unsaturated alicyclic monomer polymerized in practicing this invention. This constitutes a great advantage for this ring opening type of polymerization over conventional addition polymerization.

The low volume decrease accompanying a ring-opening polymerization is another major advantage over conventional addition polymerization, particularly where these monomers are bulk polymerized to form potting compounds and various articles, examples of which are molded plastic materials, molded rubber-like goods, shoe soles and heels, industrial belts and vehicle tires.

In these applications the monomer may be polymerized in the presence of one or more reinforcing carbon blacks, pigments or resins and certain antioxidants. The products made by this procedure may be crosslinked by adding polymerizable polyfunctional compounds, for example, bicyclopentadiene, to the main monomer. The molded products made by ring-opening polymerization may be crosslinked by exposure to ionizing radiation such as gamma rays, X-rays or electrons. These molded products may also be crosslinked or vulcanized by incorporating certain compounds which, on heating during or subsequent to the polymerization, will lead to conventional crosslinking or vulcanization of these polymers.

The polymerization reaction may be terminated by incorporating various compounds which, upon heating, release materials which deactivate the catalyst. Representative examples of such compounds are the ammonia salts such as ammonium chloride, ammonium carbonate, ammonium acetate, ammonium oleate, ammonium sulphate, and ammonium phosphate; other ammonia-releasing compounds such as tetraalkyl ammonium halides, e.g., tetramethyl ammonium chloride; water-releasing agents such as salts with water of crystallization, examples of which are:

$$Al_2(SO_4) \cdot 17H_2O$$

$$NH_4Al(SO_4)_2 \cdot 12H_2O$$

$$FeSO_4 \cdot 7H_2O$$

$MgHPO_4 \cdot 7H_2O$ $KAl(SO_4)_2 \cdot 12H_2O$ $KNaCO_3 \cdot 6H_2O$ $Na_2B_4O_7 \cdot 10H_2O$ $Na_2CO_3 \cdot 10H_2O$ $NaHPO_4 \cdot 12H_2O$ $Na_2SO_4 \cdot 10H_2O$ and $ZnNO_3 \cdot 6H_2O$ The following examples are set forth to further illustrate the nature of this invention. However, it should be understood that the examples are set forth for illustrative and not for limitative purposes. The parts and percentages are by weight unless otherwise indicated. All experiments were conducted in an atmosphere of nitrogen unless noted.

EXAMPLE 1

A series of polymerizations was carried out using 17.0 grams (gm.) of freshly distilled cyclooctene and 80 milliliters (ml.) of dried benzene in each polymerization experiment. All manipulations of charging monomer, solvent, and catalyst components were conducted under a nitrogen atmosphere. A 0.05 molar (M) solution of tungsten hexachloride ($WCl_6$) in benzene was prepared and employed in the amounts indicated in the table below. Aluminum trichloride ($AlCl_3$) was used as a 0.2 molar (M) slurry in cyclohexane. The polymerizations were carried out at room temperature and at 50° C. for from 4 minutes to 1 hour. Termination was accomplished by injection of 5 ml. of a 10 percent by weight solution of tertiarybutyl-p-cresol in methanol. All pertinent data are listed in the table below. The experiment number is set forth in column 1. Column 2 and column 3 set forth the number of moles of tungsten hexachloride and aluminum chloride respectively. Column 4 sets forth the reaction temperature; column 5 the reaction time in minutes; column 6 the weight percent yield and column 7 the mole ratio of $AlCl_3/WCl_6$ $[(B)/(A)]$.

| | | | Column Number | | | |
|---|---|---|---|---|---|---|
| 1 | 2 | 3 | 4 | 5 | 6 | 7 |
| Experiment Number: | $WCl_6$ moles $\times 10^4$ | $AlCl_3$ moles $\times 10^4$ | Temperature, °C. | Time, minutes | Yield, weight percent | Al/W |
| 1 | 1.00 | 8 | R.T. | 4 | 97.3 | 8 |
| 2 | 1.00 | 6 | R.T. | 7 | 92.7 | 6 |
| 3 | 1.00 | 8 | R.T. | 4 | 91.6 | 8 |
| 4 | 1.00 | 8 | R.T. | 15 | 94.5 | 8 |
| 5 | 1.00 | 4 | R.T. | 60 | 86.9 | 4 |
| 6 | 0.50 | 8 | R.T. | 4 | 95.7 | 16 |
| 7 | 0.50 | 6 | R.T. | 15 | 97.3 | 12 |
| 8 | 1.00 | 8 | R.T. | 4 | 102.0 | 8 |
| 9 | 0.25 | 6 | R.T. | 30 | 91.2 | 24 |
| 10 | 0.25 | 4 | R.T. | 40 | 88.6 | 16 |
| 11 | 0.10 | 8 | R.T. | 20 | 90.6 | 80 |
| 12 | 0.50 | 3 | 50 | 20 | 60.2 | 6 |
| 13 | 0.25 | 3 | 50 | 15 | 82.9 | 12 |
| 14 | 0.15 | 3 | 50 | 12 | 96.2 | 20 |
| 15 | 0.05 | 3 | 50 | 12 | 94.6 | 60 |

While certain representative embodiments and details have been shown for the purpose of illustrating the invention, it will be apparent to those skilled in the art that various changes and modifications may be made therein without departing from the spirit or scope of the invention.

What is claimed is:

1. A ring-opening polymerization process comprising polymerizing at least one unsaturated alicyclic compound selected from a group consisting of (1) unsaturated alicyclic compounds containing 4 to 5 carbon atoms in the cyclic ring and containing 1 carbon-to-carbon double bond in the cyclic ring and (2) unsaturated alicyclic compounds containing 8 to 12 carbon atoms inclusive in the cyclic ring and containing at least 1 carbon-to-carbon double bond in the cyclic ring by subjecting said alicyclic compounds to polymerization conditions in the presence of a catalyst system consisting of (A) at least one transition metal salt selected from a group consisting of tungsten halides, tungsten oxyhalides, molybdenum halides and molybdenum oxyhalides and (B) at least one Lewis acid selected from a group consisting of compounds corresponding to the general formula $MX_n$ where M is a metal represented by aluminum, zinc, gallium, tin and antimony; X is a halogen and $n$ is an integer equal to the valence of M.

2. A process according to claim 1 in which the molar relationship between the two catalyst components defined by (A) and (B) are within a molar ratio of B/A ranging from about 3/1 to at least 500/1.

3. A process according to claim 1 in which the (A) catalyst component is a transition metal halide and preferably tungsten hexachloride, tungsten hexafluoride, molybdenum pentachloride and molybdenum oxytetrafluoride.

4. A process according to claim 1 in which the (A) catalyst component is a transition metal oxyhalide and preferably tungsten oxytetrachloride, tungsten oxytetrafluoride, molybdenum oxytetrachloride and molybdenum oxytetrafluoride.

5. A process according to claim 1 in which the (B) catalyst component is an aluminum halide compound.

6. A process according to claim 1 in which the unsaturated alicyclic compound contains 4 to 5 carbon atoms and only 1 carbon-to-carbon double bond in the cyclic ring.

7. A process according to claim 1 in which the unsaturated alicyclic compound contains 8 to 12 carbon atoms inclusive in the cyclic ring and contains from 1 to 3 carbon-to-carbon double bonds in the cyclic ring which are located in a relation to each other that they are not conjugated.

8. A process according to claim 1 in which cyclooctadiene is homopolymerized.

9. A process according to claim 1 in which cyclooctene is polymerized.

10. A process according to claim 1 in which cyclooctadiene and cyclododecatriene are copolymerized.

11. A process according to claim 1 in which cyclododecatriene is homopolymerized.

12. A process according to claim 1 in which the polymerization is conducted in bulk.

13. A process according to claim 1 in which the polymerization is conducted in solution in solvents selected from a group consisting of aliphatic, alicyclic, aromatic and hydrogenated aromatic hydrocarbons.

References Cited

UNITED STATES PATENTS

| 3,074,918 | 1/1963 | Eleuterio | 260—93.1 |
| 3,449,310 | 6/1969 | Dall'Asta et al. | 260—93.1 |
| 3,458,489 | 7/1969 | Natta et al. | 260—93.1 |
| 3,459,725 | 8/1969 | Natta et al. | 260—93.1 |
| 3,462,403 | 8/1969 | Pendleton | 260—93.7 |
| 3,476,728 | 11/1969 | Natta et al. | 260—93.1 |

OTHER REFERENCES

Gaylord et al.: "Linear and Stereoregular Addition Polymers," Interscience Publishers Inc., New York, N.Y. (1959) pp. 93–97.

JOSEPH L. SCHOFER, Primary Examiner

R. A. GAITHER, Assistant Examiner

U.S. Cl. X.R.

260—93.1